United States Patent
Nagayanagi (10) Patent No.: US 6,467,656 B1
(45) Date of Patent: Oct. 22, 2002

(54) CONSTANT-QUANTITY POWDER DISPENSER INCLUDING A BALL MOVABLE TOWARD AND AWAY FROM VALVE SEAT

(75) Inventor: Masanobu Nagayanagi, Nagoya (JP)

(73) Assignee: Yanagiya Co., Ltd., Nagoya (JP)

( * ) Notice: Subject to any disclaimer, the term of this patent is extended or adjusted under 35 U.S.C. 154(b) by 0 days.

(21) Appl. No.: 10/072,134

(22) Filed: Feb. 7, 2002

(30) Foreign Application Priority Data

Dec. 27, 2001 (JP) .......................................... 2001-396547

(51) Int. Cl.[7] ............................................... G01F 11/26
(52) U.S. Cl. ....................................................... 222/456
(58) Field of Search ................................. 222/450–456

(56) References Cited

U.S. PATENT DOCUMENTS

| 4,489,859 A | * | 12/1984 | vom Hofe et al. ........... 222/450 |
| 4,921,112 A | * | 5/1990 | Juhlin et al. ................. 222/456 |
| 5,449,097 A | * | 9/1995 | Meyer .......................... 222/456 |
| 6,076,708 A | * | 6/2000 | Ceccarelli et al. ........... 222/456 |

* cited by examiner

Primary Examiner—Lesley D. Morris
Assistant Examiner—Thach H. Boi
(74) Attorney, Agent, or Firm—Burr & Brown (57) ABSTRACT

A constant-quantity powder dispenser including a main body accommodating a powdered material and having an outlet opening, a valve seat in which the outlet opening is open, a closure ball movable to be seated on the valve seat to close the outlet opening at a position within the main body, and a coil spring disposed within the main body, so as to extend from the valve seat, the coil spring having a coil accommodating the closure ball therein such that the closure ball is movable within the coil between first and second positions in a vertical direction while the main body is oriented downwards with the outlet opening being open downwards outwardly of the main body. The ball is seated on the valve seat at the first position, and is spaced apart from the valve seat at the second position to permit dispensing of the powdered material.

5 Claims, 7 Drawing Sheets

CONSTANT-QUANTITY POWDER DISPENSER INCLUDING A BALL MOVABLE TOWARD AND AWAY FROM VALVE SEAT

BACKGROUND OF THE INVENTION

1. Field of the Invention

The present invention relates in general to a constant-quantity powder dispenser, and more particularly to a constant-quantity powder dispenser which is a main body accommodating a mass of a powdered, pulverized or granular material and which is arranged to deliver a predetermined constant quantity of the powdered, pulverized or granular material, by a shaking action of the main body.

2. Discussion of Related Art

As well known in the field of storing various powdered, pulverized or granular materials (hereinafter referred to as "powdered materials") such as seasoning or flavoring materials or compositions and other powdered foods, and powdered chemicals or pharmaceuticals, there are used various types of powder dispensers each including a main body having an open end portion with an outlet opening through which the powdered material is delivered out of the main body. In use, the powder dispenser is vertically shaken or reciprocated to deliver the powdered material. Generally, such a powder dispenser is provided with a closure member which has the outlet opening and which is attached to the open end portion of the main body. Since the known powder dispenser does not have any means for controlling the quantity of the powdered material to be delivered through the outlet opening, the power dispenser suffers from a problem that the quantity of the powdered material to be actually delivered considerably varies depending upon the specific characteristic of a shaking action of the powder dispenser.

JP-Y2-7-13574 proposes a seasoning dispenser as an improved powder dispenser having a structural arrangement capable of solving the problem described above. Described more specifically, this seasoning dispenser includes a main body, and a closure member which is attached to an open end portion of the main body and which has outlet holes formed therethrough to delivery a powdered seasoning material. The closure member is provided with a guide tube fixed thereto and having a relatively small diameter. When the closure member is attached to the main body, the guide tube extends into the interior space of the main body, for guiding the seasoning material within the main body, to the outlet holes. Further, a movable body is disposed between the upper open end of the guide tube and the outlet holes of the closure member, such that the movable member closes the upper open end of the guide tube when the main body of the dispenser is oriented downwards, and is moved apart from the upper open end toward the outlet holes.

In the seasoning dispenser constructed as described above, the seasoning material accommodated in the main body is introduced into the guide tube through its lower open end remote from its upper open end on the side of the outlet holes, when the main body is inverted from the upwardly oriented position to the downwardly oriented position, that is, turned upside down. A quantity of the powdered seasoning material which is thus introduced into the guide tube is fed to the outlet opening. As long as the guide tube has a constant length, a constant quantity of the powdered seasoning material is delivered from the outlet opening each time the main body is turned between the upwardly and downwardly oriented positions.

In the constant-quantity powder dispenser in the form of the seasoning dispenser disclosed in the above-identified publication, the main body of the powder dispenser must be inverted from its upwardly oriented position to the downwardly oriented position, to deliver the powdered material (powdered seasoning material) from the outlet holes. For delivering a desired quantity of the powdered material, the main body of the powder dispenser must be repeatedly turned up and down a relatively large number of times, requiring the user to perform a cumbersome manipulation of the powder dispenser. Thus, this powder dispenser is still unsatisfactory in respect of the ease of use.

SUMMARY OF THE INVENTION

It is therefore an object of the present invention to provide a constant-quantity powder dispenser which permits easy, efficient and continuous delivery of a constant quantity of a powdered material, without a cumbersome manipulation.

The above object may be achieved according to the principle of this invention, which provides a constant-quantity powder dispenser which has a main body accommodating a mass of a powdered material and which is arranged to deliver the powdered material through an outlet opening, by a shaking action of the main body, the powder dispenser comprising: (a) a valve seat in which the outlet opening is open in the main body; (b) a closure ball movable to be seated on the valve seat to close the outlet opening at a position within an interior space of the main body; and (c) a coil spring disposed within the interior space of the main body, so as to extend from the valve seat, the coil spring having a coil accommodating the closure ball therein such that the closure ball is movable within the coil, between a first position and a second position, in a vertical direction while the main body is oriented downwards with the outlet opening being open downwards outwardly of the main body, the closure ball being seated on the valve seat when the closure ball being located at the first position, and being spaced apart from the valve seat in the vertical direction, to permit the powdered material to be delivered through the outlet opening, when the closure ball is located at the second position, wherein the closure ball is reciprocated in the vertical direction between the first and second positions to deliver the powdered material through the outlet opening, when the main body is reciprocated in the vertical direction while the main body is oriented downwards with the outlet opening being open downwards outwardly of the main body.

In the constant-quantity powder dispenser of the present invention constructed as described above, the outlet opening is closed by the closure ball when the main body is oriented downwards with the outlet opening being open downwards outwardly of the main body. Accordingly, the powdered material is prevented from being delivered through the outlet opening, when the main body is merely turned or inclined such that the outlet opening is open obliquely downwards, or merely turned upside down such that the outlet opening is opened substantially downwards. The powdered material is delivered through the outlet opening, only when the main body is shaken or reciprocated in the vertical direction to reciprocate the closure ball in the vertical direction within the coil of the coil spring, while the main body is held in the downwardly inclined or inverted attitude. Namely, the movement of the closure ball away from the valve seat permits the outlet opening to be opened at a position within the interior space of the main body, permitting a delivery of the powered material out of the interior space through the outlet opening.

The constant-quantity powder dispenser of the present invention constructed as described above is advantageous particularly in that a multiplicity of inlet apertures are formed between the adjacent helical turns of the coil spring, which helical turns are spaced apart from each other in the axial direction of the coil spring, so that the inlet apertures are arranged in a spaced-apart relation with each other over the entire length of the coil. These inlet apertures have a considerably larger total area of opening for easer entry of the powdered material, than the inlet apertures formed through a hollow portion of a hollow member which may be used as a guide member for guiding the closure ball within the main body. Accordingly, the amount of the powdered material that can be introduced into the coil spring through those inlet apertures of the coil spring is advantageously increased. Further, the coil spring may be formed of a spring steel or a hard synthetic resin exhibiting a spring characteristic. In this instance, the coil spring has a sufficiently high degree of mechanical strength, even in the presence of the inlet apertures having a large total area of opening.

Accordingly, the present constant-quantity powdered-tea dispenser of the present embodiment permits an easy, efficient and continuous delivery of the powdered material by a desired total quantity by merely shaking the main body in the vertical direction a suitable number of times, with the main body kept in the downwardly inclined or inverted attitude, unlike the conventional constant-quantity powder dispenser which must be repeatedly turned between its upwardly and downwardly oriented positions. In addition, the present powder dispenser permits a comparatively large quantity of delivery of the powdered material, without a problem of deterioration of durability of its coil spring and other components, which would be caused by insufficient mechanical strength of the components.

According to one preferred form of this invention, the constant-quantity powder dispenser further comprises a stop member which defines the second position, by abutting contact of the closure ball with the stop member during an upward movement of the closure ball while the outlet opening is open downwards outwardly of the main body. In this instance, the stop member is held by the coil spring such that the stop member is displaceable in the vertical direction relative to the coil spring.

In the constant-quantity powder dispenser according to the preferred form of this invention described just above, the above-indicated second position, which is the uppermost position of the closure ball while the main body is oriented downward with the outlet opening being open downwards outwardly of the main body, can be changed in the vertical direction, by displacing the stop member relative to the coil spring in the vertical direction. Accordingly, the reciprocating stroke of the closure ball between the first and second positions can be adjusted as needed, and the quantity of the powdered material to be delivered through the outlet opening per one reciprocating movement of the closure ball can be changed as desired, by simply adjusting the position of the stop member relative to the coil spring.

According to another preferred form of this invention, the main body includes an upper open end portion having a large opening larger than the outlet opening, and the powder dispenser further comprises a closure member which has the outlet opening and which is removably attached to the upper open end portion so as to close the large opening except a part thereof corresponding to the outlet opening. In this case, the coil is fixed to an inner surface of the closure member.

In the constant-quantity powder dispenser according to the preferred form of the invention described just above, the coil spring can be removed from the main body, together with the closure member, when the closure member is removed from the main body. This arrangement enables the user of the powder dispenser to easily and smoothly perform operations, such as an operation to fill the main body with the powdered material, and an operation to take out a relatively large quantity of the powdered material from the main body, while the large opening of the main body larger than the outlet opening is held open with the closure member removed from the main body, and such that the operations are not disturbed by the presence of the coil spring and the closure ball. In addition, the closure member and the coil spring fixed together constitute an integral unit, so that the provision of the closure member neither increases the number of components of the powder dispenser, and nor lowers the efficiency of assembling of the powder dispenser.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF THE INVENTION

To further illustrate the present invention, there will be described in detail the preferred embodiments of the constant-quantity powder dispenser of this invention, by reference to the accompanying drawings.

Figure 1:
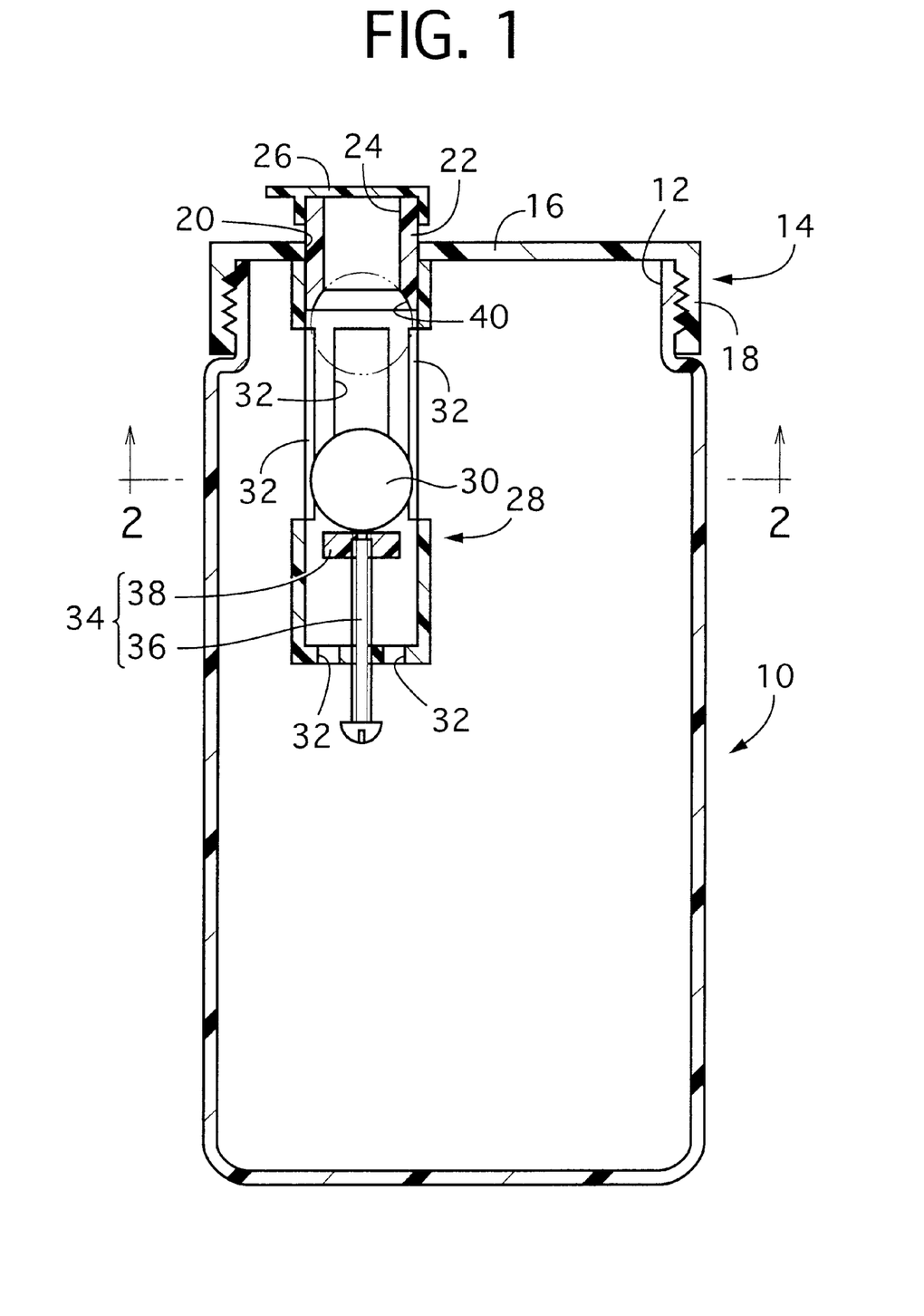
FIG. 1 is an elevational view in longitudinal cross section schematically showing a constant-quantity powder dispenser constructed according to one embodiment of this invention.
Figure 2:
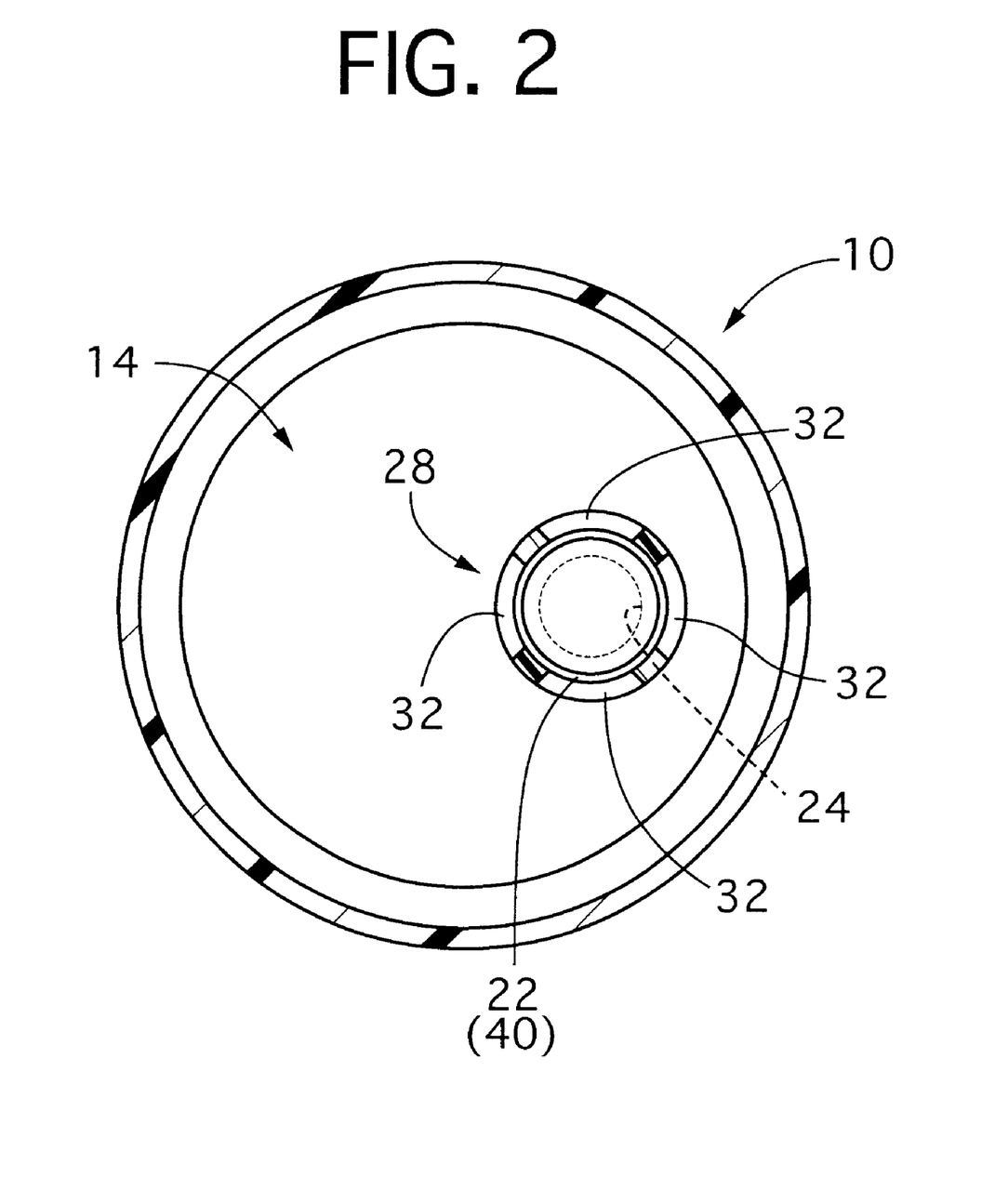
FIG. 2 is a transverse cross sectional view taken along line 2—2 of FIG. 1.

Referring first to the elevational views in longitudinal and transverse cross sections of FIGS. 1 and 2, there are schematically shown a constant-quantity powder dispenser in the form of a powdered-tea dispenser constructed according to a first embodiment of this invention. The powdered-tea dispenser is used to deliver a desired quantity of powdered tea. In FIGS. 1 and 2, reference numeral 10 denotes a main body which is a generally cylindrical container closed at its lower end and open at its upper end. The main body 10 includes a cylindrical upper open end portion 12 having a large circular opening a diameter of which is almost equal to an inside diameter of the other cylindrical portion. A mass of powdered tea can be easily accommodated in an interior space of the main body 10 through the opening of the upper open end portion 12.

The opening of the upper open end portion 12 is closed by a closure member 14, which includes a circular bottom wall 16 and a cylindrical wall 18. The bottom wall 16 has an outside diameter large enough to close the opening of the upper open end portion 12, while the cylindrical wall 18 extends from the periphery of the bottom wall 16 in the axial direction of the main body 10, and has a relatively small axial dimension. The upper open end portion 12 of the main body 10 is externally threaded while the cylindrical wall 18 of the closure member 14 is internally threaded, so that the closure member 14 is screwed at its internally threaded cylindrical wall 18 on the externally threaded cylindrical upper open end portion 12. Thus, the closure member 14 can be easily fastened and removed to and from the main body 10.

The closure member 14 has a circular hole 20 of a relatively small size formed through the thickness of its bottom wall 16. The circular hole 20 is located eccentrically with respect to the circular bottom wall 16, that is, offset by a suitable distance from the center of the bottom wall 16 in the radial direction of the closure member 14. The closure member 14 is provided with a cylindrical dispenser bushing 22 extending through the circular hole 20 so as to be fixed to the inner circumferential surface of the circular hole 20 such that the upper and lower ends of the dispenser bushing 22 are located outside and inside the main body 10, respectively. The dispenser bushing 22 has a relatively small axial dimension, and an outlet bore 24 formed therethrough to provide an outlet opening permitting a predetermined quantity of powdered tea to be delivered out of the main body 10.

The opening of the upper open end portion 12 of the main body 10 is covered by the closure member 14, except a circular part of the opening which corresponds to the outlet bore 24 offset from the center of the closure member 14. In FIG. 1, reference numeral 26 denotes a cap removably attached to the upper end portion of the dispenser busing 22, for closing the outlet bore 24.

In the powdered-tea dispenser of the present embodiment, a hollow member in the form of a cylindrical guide member 28 is fixed to the underside of the bottom wall 16 of the closure member 14 provided with the dispenser bushing 22. This guide member 28 accommodates, and is constructed to guide a closure ball 30.

Described in greater detail, the guide member 28 is a generally cylindrical member having a larger diameter and a larger axial length than the dispenser bushing 22. The guide member 28 includes an upper end portion which is fitted on the lower portion of the dispenser bushing 22 that extends within the main body 10. This upper end portion of the guide member 28 is fixed at its upper end face to the lower or inner surface of the bottom wall 16 of the closure member 14. When the closure member 14 is screwed on the upper open end portion 12 of the main body 10, the guide member 28 is located within the interior space of the main body 10, so as to extend in the axial direction of the main body 10.

The guide member 28 includes a hollow portion in the form of a cylindrical wall. This cylindrical wall has four inlet apertures 32 formed through an axially intermediate portion thereof such that the inlet apertures 32 extends in the axial direction. The four inlet apertures 32 are equally spaced apart from each other in the circumferential direction of the guide member 28, such that the two of the four inlet apertures 32 are opposed to each other in one diametric direction of the cylindrical wall, while the other two inlet apertures 32 are opposed to each other in another diametric direction perpendicular to the above-indicated one diametric direction. These inlet apertures 32 are provided to permit a mass of the powdered tea accommodated in the main body 10, to be introduced into the guide member 28. The guide member 28 has a bottom wall remote from its upper open end fixed to the closure member 14. This bottom wall also has a plurality of inlet apertures 32 formed through its thickness, in a relatively radially outer portion thereof. Thus, the powdered tea can be smoothly and efficiently introduced into the interior of the guide member 28 through the inlet apertures 32 formed through the cylindrical and bottom walls.

The guide member 28 constructed as described above is provided with a stop member 34 fixed thereto. This stop member 34 consists of an externally threaded rod portion 36 having a relatively large axial length, and a disc portion 38 fixed to one end of the rod portion 36 located within the guide member 28. The above-indicated bottom wall of the guide member 28 has a central tapped hole, and the stop member 34 is fixed to the bottom wall such that the externally threaded rod portion 36 is screwed through the central tapped hole at its axially intermediate part, and such that the disc portion 38 fixed to the inner end of the rod portion 36 is located within the interior space of the guide member 28.

The stop member 34 can be displaced in the vertical direction or the axial direction of the guide member 28 by rotating the stop member 34, that is, by changing the axial position at which the externally threaded rod portion 36 of the stop member 34 is screwed through the bottom wall of the stop member 28. Accordingly, the position of the disc portion 38 located within the guide member 28 can be changed in the axial direction with a change of the vertical position of the stop member 34.

As described above, the closure ball 30 is disposed within the guide member 28 constructed as described above. The closure ball 30 is formed of a metallic or other heavy material, and has a diameter which is slightly smaller than an inside diameter of the cylindrical portion of the guide member 28, and is larger than a dimension of each of the four inlet apertures 32 formed through the cylindrical portion of the guide member 28, as measured in the circumferential direction of the guide member 28. Thus, the closure ball 30 is held unremovably accommodated within the cylindrical portion of the guide member 28, such that the closure ball 30 is movable in a rolling fashion within the guide member 28 in the axial direction, when the main body 10 is inverted or turned upside down.

When the present constant-quantity powdered-tea dispenser is not in use, the main body 10 is oriented upwards with its outlet bore 24 being open upwards outwardly of the main body 10. In this attitude, the closure ball 30 is held in abutting contact with the upper surface of the disc portion 38 of the stop member 34, which disc portion 38 is spaced apart downwards by a predetermined distance from the lower end face of the inner end portion of the dispenser bushing 22 which has the outlet bore 24, as indicated by solid line in FIG. 1. Thus, the interior space of the main body 10 is held in communication with the outside of the main body 10 through the outlet bore 24, while the closure ball 30 is prevented from being moved downwards.

When the main body 10 is inverted or oriented downwards with the outlet bore 24 being open downwards outwardly of the main body 10, the closure ball 30 is rolled downwards by its own weight while being guided by the guide member 28, until the closure ball 30 comes into abutting contact with the lower open end of the lower portion of the dispenser bushing 22, as indicated by two-dot chain line in FIG. 1, more precisely, until the closure ball 30 is seated on a valve seat 40 which is defined by the edge of the lower open end of the outlet bore 24. The valve seat 40 has an annular part-spherical surface which corresponds to a part of a sphere of the closure ball 30 and which is formed around the above-indicted edge. In this downwardly oriented attitude of the main body 10, the outlet bore 24 which is open in the valve seat 40, is closed at its lower end by the closure ball 30.

It will be understood from the foregoing description of the present embodiment that the closure ball 30 is movable between a first position at which the closure ball 30 is seated on the valve seat 40 to close the lower end of the outlet bore 24 of the dispenser bushing 22, and a second position at which the closure ball 30 is in abutting contact with the disc portion 38 of the stop member 34 and is spaced apart downwards from the lower open end of the outlet bore 24, for holding the outlet bore 24 in communication with the interior space of the main body 10. The closure ball 30 is movable within the guide member 28, between the first and second positions indicated above. The second position of the closure ball 30 for abutting contact with the disc portion 38 of the stop member 34 can be changed by moving the externally threaded rod portion 36 in its axial direction relative to the bottom wall of the guide member 28, whereby the distance of movement of the closure ball 30 within the guide member 28 in the axial direction of the guide member 28 can be adjusted as needed.

Figure 3:
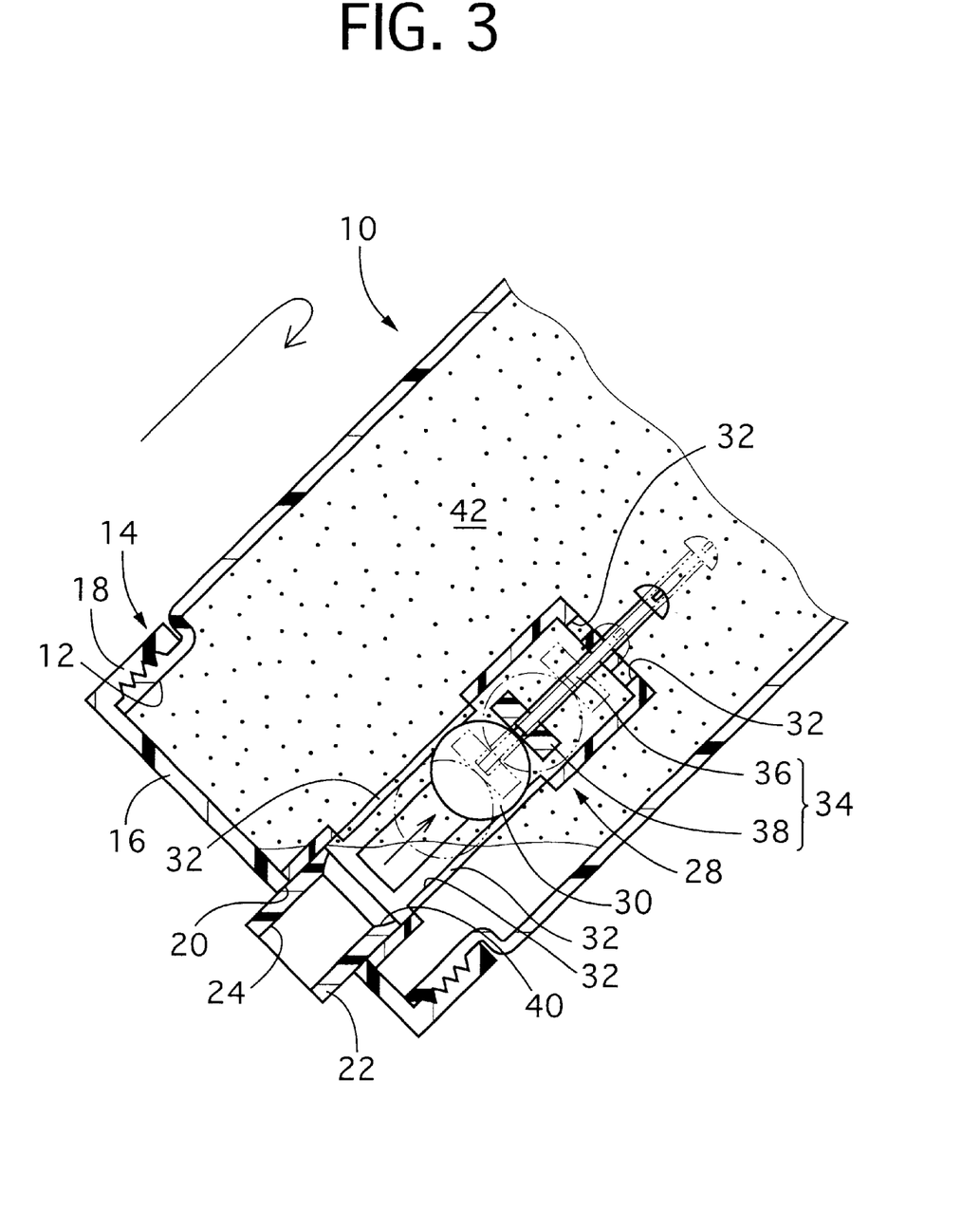
FIG. 3 is a view illustrating an example of an operating state of the constant-quantity powder dispenser of FIG. 1, wherein the powder dispenser oriented substantially downwards is moved upwards.
Figure 4:
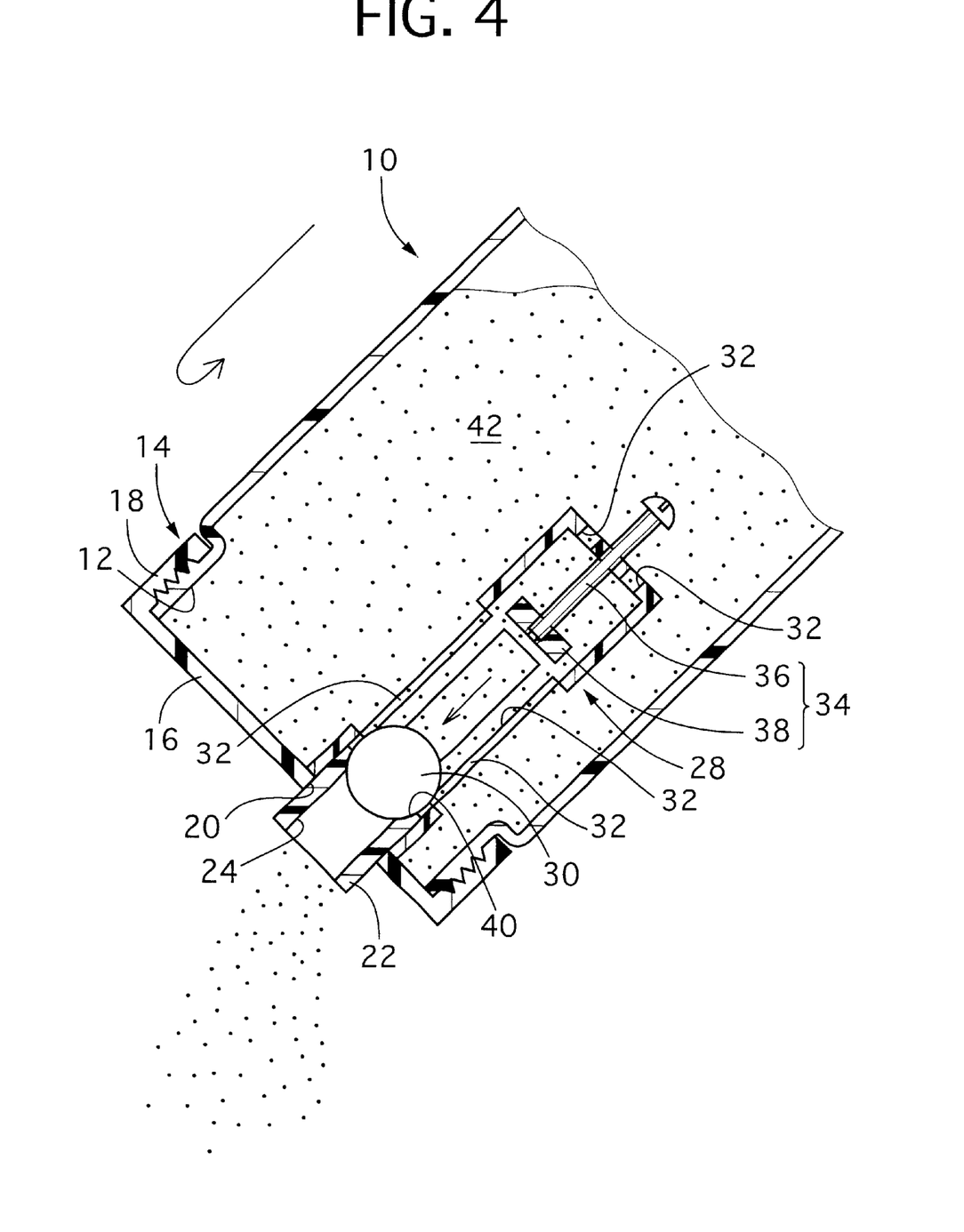
FIG. 4 is a view illustrating an example of another operating state of the powder dispenser, wherein the powder dispenser oriented substantially downwards is moved downwards after the upward movement, to deliver a predetermined quantity of powdered tea from its main body.

When the constant-quantity powdered-tea dispenser of the present embodiment constructed as described above is used to delivery the powdered tea from the main body 10, the cap 26 is first removed from the dispenser bushing 22, and the main body 10 is then inverted downwards with the outlet bore 24 being open downwards outwardly of the main body 10. During this inverting action of the main body 10, a portion of the powdered tea indicated at 42 in FIGS. 3 and 4 is introduced into the guide member 28 through the plurality of inlet apertures 32. When the main body 10 is oriented downwards, however, the closure ball 30 is seated on the valve seat 40 of the dispenser bushing 22, closing the outlet bore 24, as described above and as shown in FIG. 4, thereby preventing a delivery of the powdered tea 42 through the outlet bore 24 out of the main body 10.

Then, the main body 10 is shaken or reciprocated in the vertical direction while it is kept oriented downwards. For instance, the main body 10 is first moved upwards as indicated in FIG. 3, and is then moved downwards as indicated in FIG. 4. During acceleration of the main body 10 in the upward stroke, the closure ball 30 is held seated on the valve seat 40. When the main body 10 is decelerated in its upward stroke prior to a change from the upward stroke to the downward stroke, as indicated by a bent arrow-headed line in FIG. 3, the closure ball 30 is moved upwards into abutting contact with the disc portion 38 of the stop member 34 as indicated by a straight arrow-headed line in FIG. 3, so that the closure of the outlet bore 24 by the closure ball 30 is released. Further, the mass of the powdered tea 42 is moved upwards by a small distance within the main body 10 when the main body 10 is decelerated in its initial upward stroke. The mass of the powdered tea 42 is held spaced a small distance from the lower open end of the outlet bore 24 until the main body 10 is decelerated in the following downward stroke, so that the powdered tea 42 is not delivered through the outlet bore 24 even while the outlet bore 24 is held open during deceleration of the main body 10 in the upward stroke and acceleration in the following downward stroke, with the closure ball 30 held in contact with the stop member 34.

The distance of the upward movement of the mass of the powdered tea 42 is considerably smaller than that of the closure ball 30 during the deceleration of the main body 10 in the upward stroke, due to a relatively large friction resistance of fine particles of the powdered tea 42. Accordingly, a considerably large volume of the powdered tea 42 remains within the guide member 28 while the closure ball 30 is held in contact with the stop member 34, in the downward movement of the main body 10.

When the main body 10 is decelerated in the downward stroke before initiation of the next upward stroke, as indicated in by a bent arrow-headed line in FIG. 4, the closure ball 30 is moved downward from the position of FIG. 3 and seated onto the valve seat 40 as indicated by a straight arrow-head line in FIG. 4, so that the outlet bore 24 is again closed by the closure ball 30, as shown in the same figure. As the closure ball 30 is moved from the second position for contact with the stop member 34 to the first position for seating on the valve seat 40 of the dispenser bushing 22, a mass of the powdered tea 42 staying within the guide member 28, and a mass of the powdered tea 42 which has been newly introduced into the guide member 28 are delivered out of the main body 10 through the outlet bore 24.

Thus, the powdered tea 42 is delivered out of the main body 10 through the outlet bore 24 during the downward movement of the closure ball 30 within the guide member 28 from the second position (for contact with the stop member 34) to the first position (for seating on the valve seat 40), when the main body 10 is shaken in the vertical direction, more precisely, during deceleration of the main body 10 in each downward stroke, while the main body 10 is kept oriented almost downwards. According to the present arrangement, the quantity of the powdered tea 42 to be delivered through the outlet bore 24 by one shaking or reciprocating action of the main body 10 can be held substantially constant, as long as the axial position of engagement of the externally threaded rod portion 36 of the stop member 34 with respect to the guide member 28 is kept constant to maintain the axial position of abutting contact of the closure ball 30 with the disc portion 36 within the guide member 28, for maintaining the distance between the disc portion 36 and the valve seat 40 of the dispenser bushing 22, in other words, as long as the reciprocating stroke of the closure ball 30 within the guide member 28 is kept constant.

To increase the quantity of the powdered tea 42 to be delivered out of the main body 10, the stop member 34 is rotated, prior to the shaking action, to change the axial position of thread engagement of the externally thread rod portion 36 with the guide member 28, so as to move the disc portion 38 in the direction away from the valve seat 40 of the dispenser bushing 22, as indicated by two-dot chain line in FIG. 3, for thereby increasing the distance between the disc portion 36 and the valve seat 40. To reduce the quantity of delivery of the powdered tea 42 from the main body 10, the stop member 34 is rotated to change the axial position of thread engagement of the rod portion 36 with the guide member 28, so as to move the disc portion 38 in the direction toward the valve seat 40, for thereby reducing the distance between the disc portion 36 and the valve seat 40.

As described above, the constant-quantity powdered-tea dispenser constructed according to the present embodiment permits the powdered tea 42 to be delivered by a constant quantity from the main body 10, by simply shaking the main body 10 in the vertical direction while keeping the main body 10 in the downwardly oriented attitude with the outlet bore 24 being open almost downwards. Accordingly, the total quantity of the powdered tea 42 to be delivered out of the downwardly oriented main body 10 by repeated vertical shaking actions of the main body 10 is equal to a product of the above-indicated constant quantity per one shaking action and the number of the shaking actions.

Thus, the present constant-quantity powdered-tea dispenser of the present embodiment permits an easy efficient delivery of the powdered tea 42 by a desired total quantity by merely shaking the main body 10 in the vertical direction a suitable number of times, with the main body 10 kept oriented downwards, unlike the conventional constant-quantity powder dispenser which must be repeatedly turned between its upwardly and downwardly oriented positions. Accordingly, the present powdered-tea dispenser is highly advantageous over the conventional powder dispenser in the ease of use.

Further, the present constant-quantity powdered-tea dispenser permits easy adjustment of the delivery amount of the powdered tea 42 by a vertical shaking or reciprocating action of the main body 10 kept in its downwardly oriented position, by simply changing the axial position of thread engagement of the externally thread rod portion 36 of the stop member 34 with the guide member 28, so as to change the position of the disc portion 38 of the stop member 34 in the axial direction of the guide member 28, for thereby changing the distance between the disc portion 36 and the valve seat 40 of the dispenser bushing 22, namely, the reciprocating stroke of the closure ball 30.

The present constant-quantity powdered-tea dispenser is further advantageous in that the closure ball 30 is unremovably accommodated within the guide member 28 having a larger inside diameter than the diameter of the closure member 30, such that the vertical movement of the closure member 30 is smoothly guided by the guide member 28, between the second position for abutting contact with the stop member 34 and the first position for seating with the valve seat 40 of the dispenser bussing 22. The arrangement permits smooth and reliable manipulation of the dispenser to deliver the powdered tea 42 from the main body 10.

In addition, the guide member 28 provided in the present constant-quantity powdered-tea dispenser is integrally fixed to the closure member 14, and the closure ball 30 is unremovably accommodated within this guide member 28. Accordingly, when the closure member 14 is removed from the main body 10, the guide member 28 and the closure ball 30 can also be removed from the main body 10, together with the closure member 14. This arrangement enables the user of the dispenser to easily and smoothly perform operations, such as an operation to fill the main body 10 with the powdered tea 42, and an operation to take out a relatively large quantity of the powdered tea 42 from the main body 10, while the closure member 14 is removed from the main body 10, and such that the operations are not disturbed by the presence of the guide member 28 and the closure ball 30.

According to the present constant-quantity powdered-tea dispenser, the closure member 14, the guide member 28 and the closure ball 30 cooperate to constitute an integral unit, so that the closure member 14, guide member 28 and closure ball 30 can be efficiently assembled with the main body 10, by simply attaching the integral unit to the main body 10.

The present constant-quantity powdered-tea dispenser is further advantageous in that the outlet bore 24 is located eccentrically with respect to the circular bottom wall 16 of the closure member 14, that is, offset from the center of the bottom wall 16 in the radially outward direction. Accordingly, the guide member 28 having the inlet apertures 32 is also located eccentrically with respect to the main body 10. This arrangement permits the powdered tea 42 to be delivered by a constant quantity through the outlet bore 24 by vertical shaking actions of the main body 10, even after the amount of the powdered tea 42 left in the main body becomes relatively small. That is, the main body 10 is oriented obliquely downwards as shown in FIGS. 3 and 4, such that the circumferential portion of the main body 10 corresponding to the outlet bore 24 is located below the other circumferential portion so that a remaining mass of the powdered tea 42 lies in the lower circumferential portion of the main body 10, such that the guide member 28 is embedded in the remaining mass. In this attitude of the main body 10, the main body 10 is vertically reciprocated to reciprocate the closure ball 30, for delivering the desired quantity of the powdered tea 42. The present arrangement is effective to minimize a variation in the quantity of the powdered tea 42 to be delivered through the outlet bore 24 per one reciprocation of the closure ball 30 when the amount of the powdered tea 42 left in the main body 10 is relatively small.

In the first embodiment, the guide member 28 is a cylindrical member which is open at its upper end and substantially closed at the lower end. However, the guide member 28 may be otherwise shaped or designed, provided the guide member 28 is disposed so as to unremovably accommodate the closure ball 30, and is capable of guiding the vertical reciprocating movements of the closure ball 30 between the first position at which the closure ball 30 closes the outlet bore 24, and the second position at which the closure of the outlet bore 24 by the closure ball 30 is released.

For instance, the guide member 28 may be replaced by a guide member consisting of a plurality of pins or strips which extend from the lower or inner surface of the bottom wall 16 of the closure member 14 in the axial direction of the closure member 14, such that the pins or strips are arranged so as to accommodate the closure ball 30 so as to guide the closure ball 30 in the axial direction of the closure member 14 (main body 10). Further, the cylindrical guide member 28 may be replaced by a guide member having a transverse cross sectional shape other than a circular shape, for instance, a polygonal shape.

While the guide member 28 is integrally fixed to the closure member 14, the guide member may be removably fixed to the closure member 14, or fixed to the main body 10.

Although the cylindrical closure member 14 in the above embodiment has only one eccentrically located outlet bore 24, the closure member may have only one coaxially located outlet bore, or a plurality of outlet bores.

Figure 5:
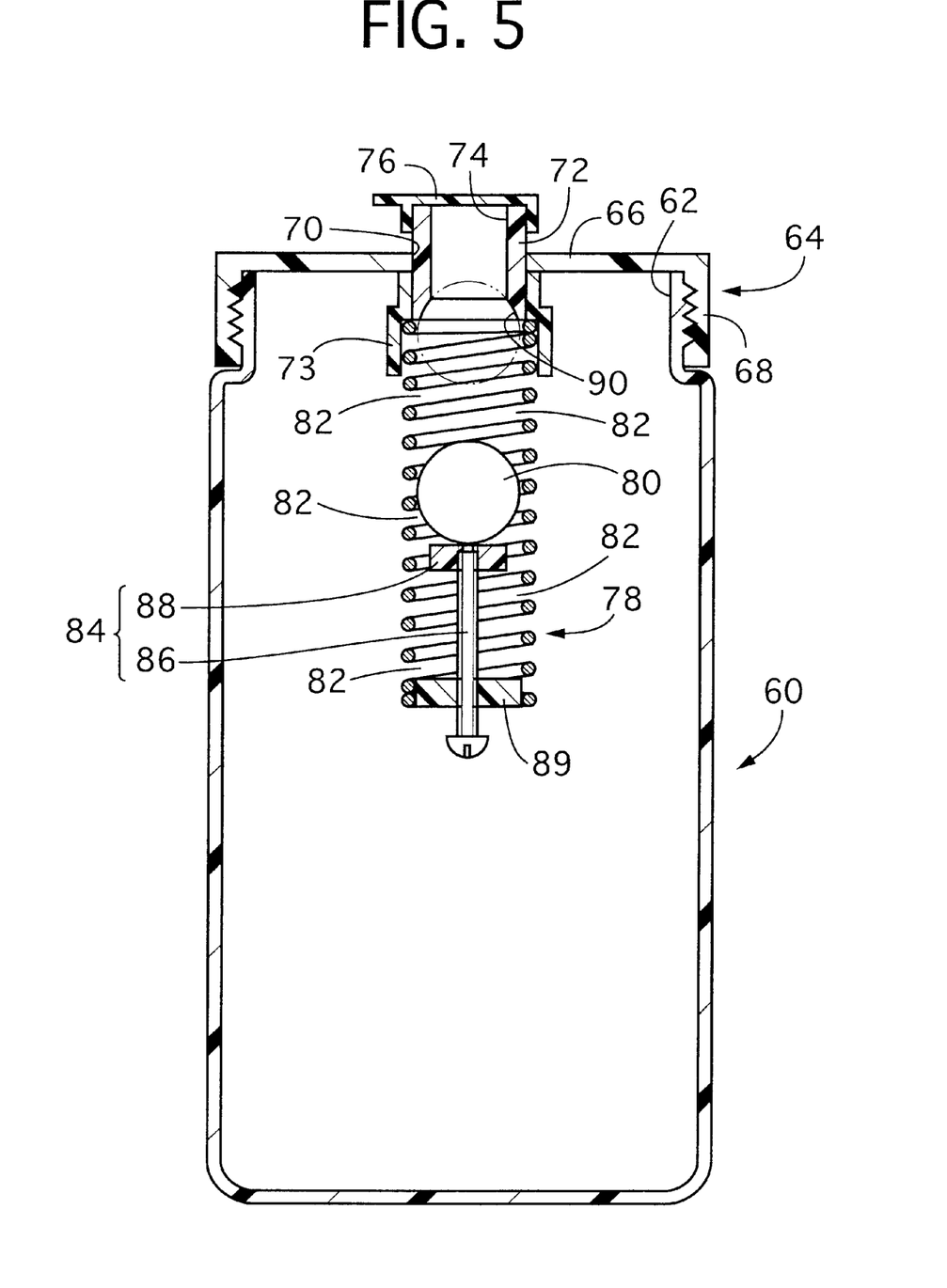
FIG. 5 is an elevational view in longitudinal cross section schematically showing a constant-quantity powder dispenser constructed according to a second embodiment of the present invention.
Figure 6:
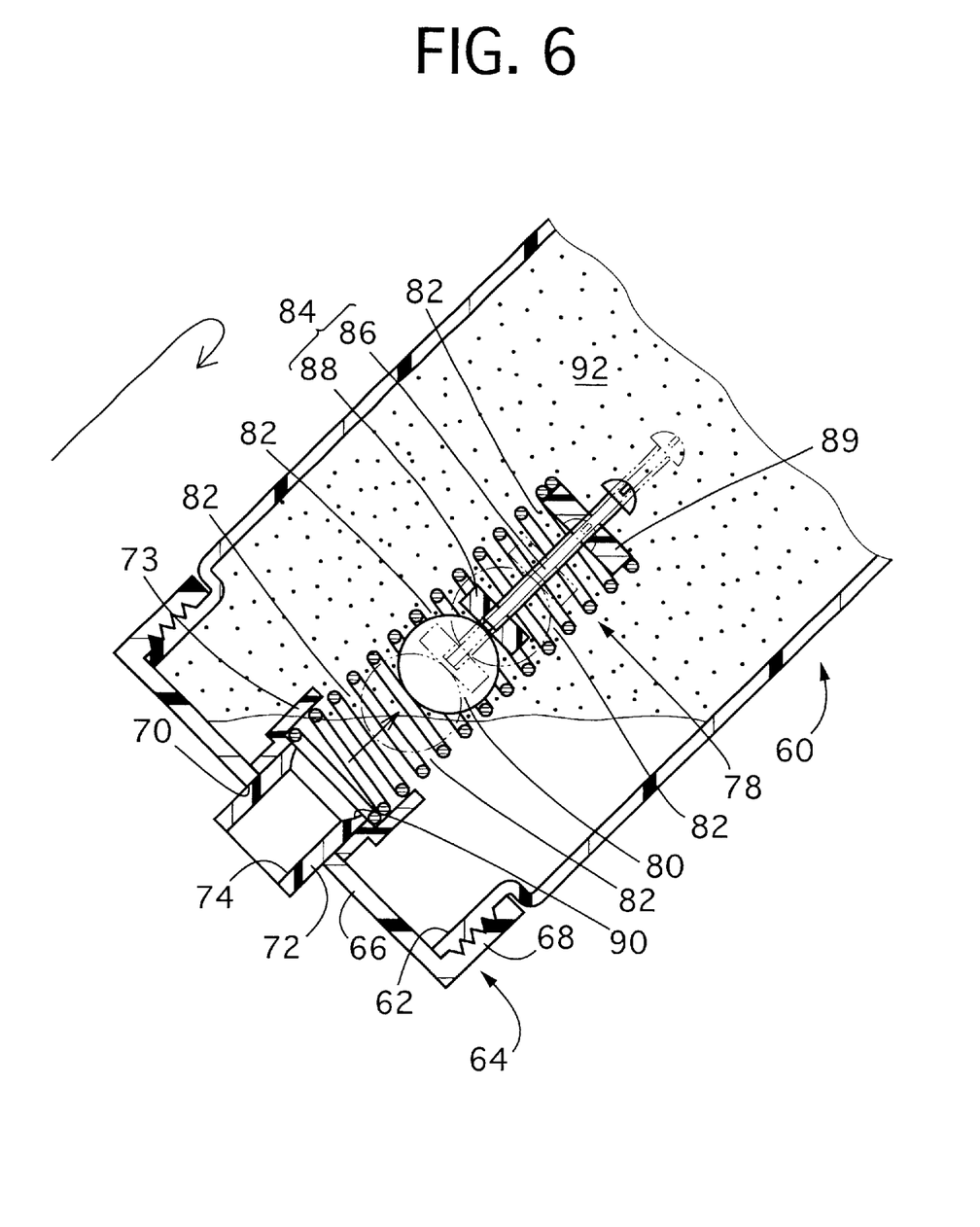
FIG. 6 is a view illustrating an example of an operating state of the powder dispenser, wherein the powder dispenser oriented substantially downwards is moved upwards.
Figure 7:
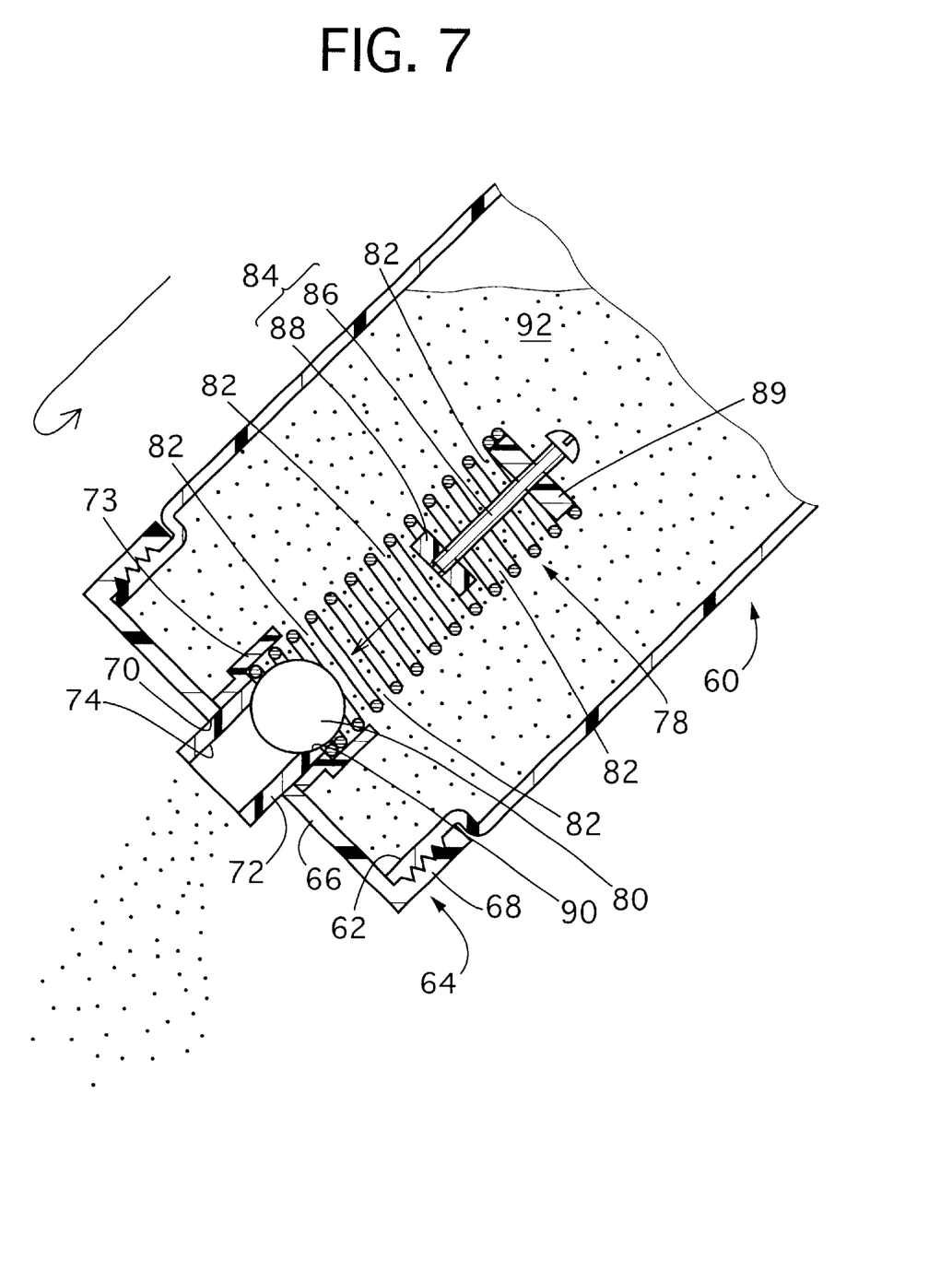
FIG. 7 is a view illustrating an example of another operating state of the powder dispenser, wherein the powder dispenser is moved downwards after the upward movement, to deliver a predetermined quantity of powdered tea from its main body.

Referring next to FIGS. 5–7, there are schematically shown a constant-quantity powdered-tea dispenser constructed according to a second embodiment of this invention, to deliver powdered tea, as in the first embodiment. In FIG. 5, reference numeral 60 denotes a main body which is a generally cylindrical container closed at its lower end and open at its upper end. The main body 60 includes a cylindrical upper open end portion 62 having a large circular opening a diameter of which is almost equal to an inside diameter of the other cylindrical portion. A mass of powdered tea can be easily accommodated in an interior space of the main body 60 through the opening of the upper open end portion 62.

The opening of the upper open end portion 62 is closed by a closure member 64, which includes a circular bottom wall 66 and a cylindrical wall 68. The bottom wall 66 has an outside diameter large enough to close the opening of the upper open end portion 62, while the cylindrical wall 68 extends from the periphery of the bottom wall 66 in the axial direction of the main body 60, and has a relatively small axial dimension. The upper open end portion 62 of the main body 60 is externally threaded while the cylindrical wall 68 of the closure member 64 is internally threaded, so that the closure member 64 is screwed at its internally threaded cylindrical wall 68 on the externally threaded cylindrical upper open end portion 62. Thus, the closure member 64 can be easily fastened and removed to and from the main body 60.

The closure member 64 has a circular hole 70 of a relatively small size formed through the thickness of a radially central portion of its bottom wall 66. The closure member 64 is provided with a cylindrical dispenser bushing 72 extending through the circular hole 70 so as to be fixed to the inner circumferential surface of the circular hole 70 such that the upper and lower ends of the dispenser bushing 72 are located outside and inside the main body 60, respectively. The dispenser bushing 72 has a relatively small axial dimension, and an outlet bore 74 formed therethrough to provide an outlet opening permitting the powdered tea to be delivered out of the main body 60.

The opening of the upper open end portion 62 of the main body 60 is covered by the closure member 74, except at a circular part of the opening which corresponds to the outlet bore 74 formed in the central portion of the closure member 64. In FIG. 5, reference numeral 76 denotes a cap removably attached to the upper end portion of the dispenser busing 72, for closing the outlet bore 74.

In the powdered-tea dispenser of the present embodiment, a guide member in the form of a coil spring 78 is fixed to the inner or lower surface of the bottom wall 66 of the closure member 64 provided with the dispenser bushing 72. This coil spring 78 accommodates, and is constructed to guide a closure ball 80.

Described in greater detail, the coil spring 78 is a know compression coil spring made of a spring steel in the form of a helical coil, and having a generally cylindrical shape with a larger diameter and a larger axial length than the dispenser bushing 72. The coil spring 78 includes an upper end portion which is fixedly fitted in a retainer sleeve 73 which is fitted on the lower portion of the dispenser bushing 72 that extends within the main body 60. When the closure member 64 is screwed on the upper open end portion 62 of the main body 60, the coil spring 78 is located within the interior space of the main body 60, so as to extend in the axial direction of the main body 60.

The coil spring 78 has a multiplicity of inlet apertures 82 formed between adjacent helical turns of its coil, which are spaced apart from each other in the axial direction, so that the inlet apertures 82 are arranged in a spaced-apart relation with each other over the entire length of the coil. These inlet apertures 72 are provided to permit a mass of the powdered tea accommodated in the main body 60, to be introduced into the interior space of the coil spring 78. In the present second embodiment, the powdered tea is introduced into the coil spring 78 in all radial directions through the entire circumference of the inlet apertures 82 which are arranged over the entire length of the coil spring 78. Thus, the inlet apertures 82 have a considerably large total area of opening for easier entry of the powdered tea.

The coil spring 78 constructed as described above is provided with a stop member 84 fixed thereto. This stop member 84 consists of an externally threaded rod portion 86 having a relatively large axial length, and a disc portion 88 fixed to one end of the rod portion 86 located within the coil spring 78. The coil spring 78 has a mounting disc 89 fixed at its free end remote from the fixed end portion fitted in the retainer sleeve 73. The mounting disc 89 has a central tapped hole, and the stop member 84 is fixed to the mounting disc 89 such that the externally threaded rod portion 86 is screwed through the central tapped hole at its axially intermediate part, and such that the disc portion 83 fixed to the inner end of the rod portion 86 is located within the interior space of the coil spring 78.

The stop member 84 can be displaced in the vertical direction or the axial direction of the coil spring 78 by rotating the stop member 84, that is, by changing the axial position at which the externally threaded rod portion 86 of the stop member 64 is screwed through the mounting disc 89 of the stop member 84. Accordingly, the position of the disc portion 88 located within the coil spring 78 can be changed in the axial direction with a change of the vertical position of the stop member 84.

As described above, the closure ball 80 is disposed within the coil spring 78 constructed as described above. The closure ball 80 is formed of a metallic or other heavy material, and has a diameter which is slightly smaller than an inside diameter of the coil spring 78, and is larger than a dimension of each of the inlet aperture 82 of the coil spring 78, as measured in the axial direction of the coil spring 78. Thus, the closure ball 80 is held unremovably accommodated within the coil of the coil spring 788, such that the closure ball 80 is movable in a rolling fashion within the coil spring 78 in the axial direction, when the main body 60 is inverted or turned upside down.

When the present constant-quantity powdered-tea dispenser is not in use, the main body 60 is oriented upwards with its outlet bore 74 being open upwards outwardly of the main body 60. In this attitude, the closure ball 80 is held in abutting contact with the upper surface of the disc portion 88 of the stop member 84, which disc portion 88 is spaced apart downwards by a predetermined distance from the lower end face of the inner end portion of the dispenser bushing 72 which has the outlet bore 74, as indicated by solid line in FIG. 51. Thus, the interior space of the main body 60 is held in communication with the outside of the main body 60 through the outlet bore 74, while the closure ball 80 is prevented from being moved downwards.

When the main body 60 is inverted or oriented downwards with the outlet bore 74 being open downwards outwardly of the main body 60, the closure ball 80 is rolled downwards by its own weight while being guided by the coil spring 78, until the closure ball 80 comes into abutting contact with the lower open end of the lower portion of the dispenser bushing 72, as indicated by two-dot chain line in FIG. 5, more precisely, until the closure ball 80 is seated on a valve seat 90 which is defined by the edge of the lower open end of the outlet bore 74. The valve seat 90 has an annular part-spherical surface which corresponds to a part of a sphere of the closure ball 80 and which is formed around the above-indicted edge. In this downwardly oriented attitude of the main body 60, the outlet bore 74 which is open in the valve seat 90 is closed at its lower end by the closure ball 80.

It will be understood from the foregoing description of the present second embodiment that the closure ball 80 is movable between a first position at which the closure ball 80 is seated on the valve seat 90 to close the lower end of the outlet bore 74 of the dispenser bushing 72, and a second position at which the closure ball 80 is in abutting contact with the disc portion 88 of the stop member 84 and is spaced apart downwards from the lower open end of the outlet bore 74, for holding the outlet bore 74 in communication with the interior space of the main body 60. The closure ball 80 is movable within the coil spring 78, between the first and second positions indicated above. The second position of the closure ball 80 for abutting contact with the disc portion 88 of the stop member 84 can be changed by moving the externally threaded rod portion 86 in its axial direction relative to the mounting disc 89, whereby the distance of movement of the closure ball 80 within the coil spring 78 in the axial direction of the coil spring 78 can be adjusted as needed.

When the constant-quantity powdered-tea dispenser of the present embodiment constructed as described above is used to delivery the powdered tea from the main body 60, the cap 76 is first removed from the dispenser bushing 72, and the main body 60 is then inverted downwards with the outlet bore 74 being open downwards outwardly of the main body 60. During this inverting action of the main body 60, a portion of the powdered tea indicated at 92 in FIGS. 6 and 7 is introduced into the coil spring 78 through the inlet apertures 82 having a large total area of opening. When the main body 60 is oriented downwards, however, the closure ball 80 is seated on the valve seat 90 of the dispenser bushing 72, closing the outlet bore 74, as described above and as shown in FIG. 7, thereby preventing a delivery of the powdered tea 92 through the outlet bore 74 out of the main body 60.

Then, the main body 60 is shaken or reciprocated in the vertical direction while it is kept oriented downwards. For instance, the main body 60 is first moved upwards as indicated in FIG. 6, and is then moved downwards as indicated in FIG. 7. During acceleration of the main body 60 in the upward stroke, the closure ball 80 is held seated on the valve seat 90. When the main body 60 is decelerated in its upward stroke prior to a change from the upward stroke to the downward stroke, as indicated by a bent arrow-headed line in FIG. 6, the closure ball 80 is moved upwards into abutting contact with the disc portion 88 of the stop member 84 as indicated by a straight arrow-headed line in FIG. 6, so that the closure of the outlet bore 74 by the closure ball 80 is released. Further, the mass of the powdered tea 92 is moved upwards by a small distance within the main body 60 when the main body 60 is decelerated in its initial upward stroke. The mass of the powdered tea 92 is held spaced a small distance from the lower open end of the outlet bore 74 until the main body 60 is decelerated in the following downward stroke, so that the powdered tea 92 is not delivered through the outlet bore 74 even while the outlet bore 74 is held open during deceleration of the main body 60 in the upward stroke and acceleration in the following downward stroke, with the closure ball 80 held in contact with the stop member 84.

The distance of the upward movement of the mass of the powdered tea 92 is considerably smaller than that of the closure ball 80 during the deceleration of the main body 60 in the upward stroke, due to a relatively large friction resistance of fine particles of the powdered tea 92. Accordingly, a considerably large volume of the powdered tea 92 remains within the coil spring 78 while the closure ball 80 is held in contact with the stop member 84, in the downward movement of the main body 60.

When the main body 60 is decelerated in the downward stroke before initiation of the next upward stroke, as indicated in by a bent arrow-headed line in FIG. 7, the closure ball 80 is moved downward from the position of FIG. 6 and seated onto the valve seat 90 as indicated by a straight arrow-head line in FIG. 4, so that the outlet bore 74 is again closed by the closure ball 80, as shown in the same figure. As the closure ball 80 is moved from the second position for contact with the stop member 84 to the first position for seating on the valve seat 90 of the dispenser bushing 72, a mass of the powdered tea 92 staying within the coil spring 78, and a mass of the powdered tea 92 which has been newly introduced into the coil spring 78 are delivered out of the main body 60 through the outlet bore 74.

Thus, the powdered tea 92 is delivered out of the main body 60 through the outlet bore 74 during the downward movement of the closure ball 80 within the coil spring 78 from the second position (for contact with the stop member 84) to the first position (for seating on the valve seat 90), when the main body 60 is shaken in the vertical direction, more precisely, during deceleration of the main body 60 in each downward stroke, while the main body 60 is kept oriented almost downwards. According to the present arrangement, the quantity of the powdered tea 92 to be delivered through the outlet bore 74 by one shaking or reciprocating action of the main body 60 can be held substantially constant, as long as the axial position of engagement of the externally threaded rod portion 86 of the stop member 84 with respect to the coil spring 78 is kept constant to maintain the axial position of abutting contact of the closure ball 80 with the disc portion 86 within the guide member 78, for maintaining the distance between the disc portion 86 and the valve seat 90 of the dispenser bushing 72, in other words, as long as the reciprocating stroke of the closure ball 80 within the coil spring 78 is kept constant.

To increase the quantity of the powdered tea 92 to be delivered out of the main body 60, the stop member 84 is rotated, prior to the shaking action, to change the axial position of thread engagement of the externally thread rod portion 86 with the mounting disc 89, so as to move the disc portion 88 in the direction away from the valve seat 90 of the dispenser bushing 72, as indicated by two-dot chain line in FIG. 6, for thereby increasing the distance between the disc portion 86 and the valve seat 90. To reduce the quantity of delivery of the powdered tea 92 from the main body 60, the stop member 84 is rotated to change the axial position of thread engagement of the rod portion 86 with the mounting disc 89, so as to move the disc portion 88 in the direction toward the valve seat 90, for thereby reducing the distance between the disc portion 86 and the valve seat 90.

As described above, the constant-quantity powdered-tea dispenser constructed according to the present second embodiment also permits the powdered tea 92 to be delivered by a constant quantity from the main body 60, by simply shaking the main body 60 in the vertical direction while keeping the main body 60 in the downwardly oriented attitude with the outlet bore 74 being open almost downwards. Accordingly, the total quantity of the powdered tea 92 to be delivered out of the downwardly oriented main body 60 by repeated vertical shaking actions of the main body 60 is equal to a product of the above-indicated constant quantity per one shaking action and the number of the shaking actions.

Thus, the present constant-quantity powdered-tea dispenser of the present embodiment permits an easy efficient delivery of the powdered tea 92 by a desired total quantity by merely shaking the main body 60 in the vertical direction a suitable number of times, with the main body 60 kept oriented downwards, unlike the conventional constant-quantity powder dispenser which must be repeatedly turned between its upwardly and downwardly oriented positions. Accordingly, the present powdered-tea dispenser is also highly advantageous over the conventional powder dispenser in the ease of use.

The present constant-quantity powdered-tea dispenser is further advantageous in that the multiple inlet apertures 82 are formed between the adjacent helical turns of the coil spring 78, which helical turns are spaced apart from each other in the axial direction of the coil spring 78, so that the inlet apertures 82 are arranged in the spaced-apart relation with each other over the entire length of the coil. These inlet apertures 82 have a considerably large total area of opening for easier entry of the powdered tea. Accordingly, the amount of the powdered tea 92 that can be introduced into the coil spring 78 through those inlet apertures 82 is advantageously increased. In addition, the coil spring 78 formed of a spring steel has a sufficiently high degree of mechanical strength, even in the presence of the inlet apertures 82 having a large total area of opening.

Thus, the quantity of the powdered tea 92 that can be delivered through the outlet bore 74 per one vertical reciprocating action of the closure ball 80 is effectively increased, without deterioration of the coil spring 78 even in the presence of the large inlet apertures 82 provided for introducing the powdered tea 92 into the coil spring 78 to deliver the powdered tea 92.

Further, the present constant-quantity powdered-tea dispenser permits easy adjustment of the delivery amount of the powdered tea 92 by a vertical shaking or reciprocating action of the main body 60 kept in its downwardly oriented position, by simply changing the axial position of thread engagement of the externally thread rod portion 86 of the stop member 84 with the coil spring 78, so as to change the position of the disc portion 88 of the stop member 84 in the axial direction of the coil spring 94, for thereby changing the distance between the disc portion 86 and the valve seat 90 of the dispenser bushing 72, namely, the reciprocating stroke of the closure ball 80.

In addition, the coil spring 78 provided in the present constant-quantity powdered-tea dispenser is integrally fixed to the closure member 64, and the closure ball 80 is unremovably accommodated within this coil spring 78. Accordingly, when the closure member 64 is removed from the main body 60, the coil spring 78 and the closure ball 80 can also be removed from the main body 60, together with the closure member 64. This arrangement enables the user of the dispenser to easily and smoothly perform operations, such as an operation to fill the main body 60 with the powdered tea 92, and an operation to take out a relatively large quantity of the powdered tea 92 from the main body 60, while the closure member 64 is removed from the main body 60, and such that the operations are not disturbed by the presence of the coil spring 78 and the closure ball 80.

According to the present constant-quantity powdered-tea dispenser, the closure member 64, the coil spring 78 and the closure ball 80 cooperate to constitute an integral unit, so that the closure member 64, coil spring 78 and closure ball 80 can be efficiently assembled with the main body 60, by simply attaching the integral unit to the main body 60.

Although the coil spring 78 used in the second embodiment is made of a spring steel, the coil spring 78 may be made of any other suitable material such as a hard synthetic resin, provided that the coil spring 78 has a sufficient mechanical strength. The compression coil spring 78 may be replaced by a tension coil spring made of a metallic, resin or any other suitable material.

While the coil spring 78 in the second embodiment is fixed to the closure member 64, the coil spring 78 may be removably attached to the closure member 64 or to the main body 60.

In the second embodiment, the outlet bore 74 is formed in the central portion of the closure member 64. However, the location of the outlet bore 74 is not limited. For example, the position of an outlet bore may be formed offset a suitable distance from the center of the cylindrical bottom wall 66 of the closure member 64 in the radial direction. In this case, the coil spring 78 having the inlet apertures 82 is also located offset from the center of the bottom wall 66. This arrangement permits the powdered tea 92 to be delivered by a constant quantity through the outlet bore 74 by vertical shaking actions of the main body 60, even after the amount of the powdered tea 92 left in the main body 60 becomes relatively small. That is, the main body 60 is oriented obliquely downwards as shown in FIGS. 6 and 7, such that the circumferential portion of the main body 60 corresponding to the outlet bore 74 is located below the other circumferential portion so that a remaining mass of the powdered tea 92 lies in the lower circumferential portion of the main body 60, such that the coil spring 78 is embedded in the remaining mass. In this attitude of the main body 60, the main body 60 is vertically reciprocated to reciprocate the closure ball 80, for delivering the desired quantity of the powdered tea 92. The present arrangement is effective to minimize a variation in the quantity of the powdered tea 92 to be delivered through the outlet bore 74 per one reciprocation of the closure ball 80 when the amount of the powdered tea 92 let in the main body 60 is relatively small.

Although the preferred embodiments of the constant-quantity powder dispenser of the present invention have been described above, it is to be understood that the present invention may be embodied with various changes and modifications.

While the outlet bore 24 or 74 formed through the dispenser bushing 22, 72 fixed to the bottom wall 16, 66 of the closure member 14, 64 provides an outlet opening through which the powdered tea 42, 92 is delivered, the outlet opening may be formed directly through the closure member 14, 64, or may be formed through the main body 10, 60 as a relatively small opening in addition to the relatively large opening provided by the upper open end portion 12, 62.

Although the upper open end portion 12, 62 of the main body 10, 60 having the opening closed by the closure member 14, 64 has a relatively large diameter almost equal to the inside diameter of the other axial portion of the main body 10, 60, the diameter of the upper end portion of the main body 10 may be considerably smaller than the inside diameter of the other axial portion.

While the closure ball 30 provided in the above embodiment is formed of a metallic material, the material of the closure ball is not limited to the metallic material.

The structural arrangements to adjust the position of the stop member 34, 84 in the axial direction of the main body 10, 60 are limited to those in the illustrated first and second embodiments, but any known arrangements may be employed to move a stop member relative to the guide member 28, 78. Further, the adjustable stop member 34, 84 may be replaced by a stationary stop member the position of which determines a constant delivery quantity of the powder to be delivered from the main body.

The constant-quantity powdered-tea dispensers of the illustrated embodiments are arranged such that the outlet bore 24, 74 is open upwards outwardly of the main body 10 when the main body 10 is oriented upwards while the dispenser is not in use. However, the dispenser busing 22, 72 need not extend upwards from the closure member 14, 64 outwardly of the main body 10, 60. Further, the closure member 14 may be formed with a seating structure for enabling the main body 10, 60 to be placed on a table or the like, in the downwardly oriented attitude while the dispenser is not in use. In this case, the user need not turn the main body 10, 60 upside down before initiating a shaking action of the main body 10, 60 when the dispenser is used to deliver the powdered tea 42. Thus, the present arrangement improves the ease of use of the dispenser. In this respect, it is noted that the closure ball 30, 80 is held seated on the valve seat 40, 90, preventing a delivery of the powdered tea 42 through the outlet bore 24, 74 even while the main body 10 is kept in the downwardly oriented attitude.

While the embodiments of the present invention as applied to the powdered-tea dispensers have been described above, the principle of the invention is equally applicable to any constant-quantity powder dispensers arranged to deliver powdered, pulverized or granular materials other than powdered tea, such as powdered foods such as powdered seasoning or flavoring materials, and powdered chemicals or pharmaceuticals.

It is to be understood that the present invention may be embodied with various other changes, modifications and improvements, which may occur to those skilled in the art, without departing from the spirit and scope of the invention defined in the following claims:

What is claims is:

1. A constant-quantity powder dispenser which has a main body accommodating a mass of a powdered material and which is arranged to deliver the powdered material through an outlet opening, by a shaking action of the main body, said constant-quantity powder dispenser comprising:

a valve seat in which said outlet opening is open in said main body;

a closure ball movable to be seated on said valve seat to close said outlet opening at a position within an interior space of said main body; and a coil spring disposed within said interior space of said main body, and extending from said valve seat, said coil spring having a coil accommodating said closure ball therein such that said closure ball is movable within said coil, between a first position and a second position, in a vertical direction while said main body is oriented downwards with said outlet opening being open, and extending outwardly from said main body, said closure ball being seated on said valve seat when said closure ball is located at said first position, and being spaced apart from said valve seat in said vertical direction, to permit said powdered material to be delivered through said outlet opening, when said closure ball is located at said second position, wherein said closure ball is reciprocated in said vertical direction between said first and second positions to deliver said powdered material through said outlet opening, when said main body is reciprocated in said vertical direction while said main body is oriented downwards with said outlet opening being open downwards outwardly of said main body.

2. A constant-quantity powder dispenser according to claim 1, further comprising a stop member which defines said second position, by abutting contact of said closure ball with said stop member during an upward movement of said closure ball while said outlet opening is open, said stop member being held by said coil spring such that said stop member is displaceable in said vertical direction relative to said coil spring.

3. A constant-quantity powder dispenser according to claim 1, wherein said main body includes an upper open end portion having a large opening larger than said outlet opening, said powder dispenser further comprising a closure member, a portion of which has said outlet opening formed therethrough and which is removably attached to said upper open end portion to close said large opening except said portion thereof corresponding to said outlet opening, said coil spring being fixed to an inner surface of said closure member.

4. A constant-quantity powder dispenser according to claim 3, wherein said closure member has a circular hole, and is provided with a dispenser bushing which extends through said circular hole, and is fixed to an inner circumferential surface of said circular hole such that upper and lower ends of said dispenser bushing are located outside and inside said main body, respectively, said dispenser bushing having an outlet bore which defines said outlet opening.

5. A constant-quantity powder dispenser according to claim 4, further comprising a retainer sleeve which is fitted on a lower end portion of said dispenser bushing and which is fixed to said inner surface of said closure member, and wherein said coil spring includes an upper end portion fixedly fitted in said retainer sleeve.

* * * * *

UNITED STATES PATENT AND TRADEMARK OFFICE
CERTIFICATE OF CORRECTION

PATENT NO. : 6,467,656 B1
DATED : October 22, 2002
INVENTOR(S) : Masanobu Nagayanagi It is certified that error appears in the above-identified patent and that said Letters Patent is hereby corrected as shown below:

<u>Title page,</u>
Item [56], References Cited, please add:

-- FOREIGN PATENT DOCUMENTS
JP      7-13574         4/1995 --

Signed and Sealed this

Twenty-fifth Day of February, 2003

JAMES E. ROGAN
*Director of the United States Patent and Trademark Office*